United States Patent [19]

Middeldorp

[11] Patent Number: 4,977,998
[45] Date of Patent: Dec. 18, 1990

[54] DEVICE FOR EJECTING WRONGLY ORIENTED COVERS FROM A CONTINUOUS FLOW

[75] Inventor: Derk J. Middeldorp, NL-8121 CS Olst, Koekoeksweg 4, Netherlands

[73] Assignee: Thomassen & Drijver-Verblifa N.V., Deventer, Netherlands

[21] Appl. No.: 423,957

[22] Filed: Oct. 18, 1989

[30] Foreign Application Priority Data

Jun. 27, 1989 [NL] Netherlands ............... 8901626

[51] Int. Cl.⁵ .................................... B65G 43/08
[52] U.S. Cl. ............................. 198/395; 198/398; 209/576; 221/157
[58] Field of Search ............ 198/395, 398; 209/576, 209/577, 539, 586, 587, 588, 598, 651–653, 928, 936; 221/157

[56] References Cited

U.S. PATENT DOCUMENTS 3,690,487 9/1972 Evans, Jr. et al. ............ 198/395 X
3,710,922 1/1973 Lanphere et al. ............... 198/395
4,655,350 4/1987 Mojden et al. ................ 198/398 X Primary Examiner—H. Grant Skaggs
Assistant Examiner—D. Glenn Dayoan
Attorney, Agent, or Firm—Willian Brinks Olds Hofer Gilson & Lione

[57] ABSTRACT

The invention provides a device for removing individual covers from a continuous flow of covers, each consisting of a middle portion and a peripheral edge extending around it asymmetrically in relation to the main plane, the main planes of which covers extend perpendicularly to the conveying direction, while the nominal orientations of the covers in the conveying direction are all the same and the said individual covers are oppositely oriented in relation to the nominal orientation, the device includes a conveyor for transporting the covers in a continuous flow, a detector placed adjacent to the conveyor for distinguishing an oppositely oriented cover and an ejector for removing from the flow a detected oppositely oriented cover.

7 Claims, 2 Drawing Sheets

DEVICE FOR EJECTING WRONGLY ORIENTED COVERS FROM A CONTINUOUS FLOW

BACKGROUND OF THE INVENTION

The invention lies in the field of the handling of a continuous flow of covers, each comprising a middle portion and a peripheral edge extending around it asymmetrically in relation to the main plane, the main planes of which covers extend perpendicularly to the conveying direction, while the nominal orientations of the covers in the conveying direction are all the same.

When transporting such covers in a continuous flow it is of essential importance for the processing thereof that all the covers have the same orientation. It can happen however that because of a disturbance a cover will from time to time display an opposite orientation. This can be very inconvenient for the further, particularly automatic, handling of the covers and can cause disturbances. Therefore until now the flow of covers has been visually inspected and an opposite oriented cover removed from the flow.

SUMMARY OF THE INVENTION

The object of the invention is to have such an inspection take place automatically. For this purpose the invention provides a device for removing individual covers from a continuous flow of covers, each consisting of a middle portion and a peripheral edge extending around it asymmetrically in relation to the main plane, the main planes of which covers extend perpendicularly to the conveying direction, while the nominal orientations of the covers in the conveying direction are all the same and the said individual covers are oppositely oriented in relation to the nominal orientation, which device comprises:

a conveyor for transporting the covers in a continuous flow, a detector placed adjacent to the conveyor for distinguishing an oppositely oriented cover, and an ejector for removing from the flow a detected oppositely oriented cover.

After the presence of an oppositely oriented cover has been determined the ejector must be capable of ejecting with complete certainty the cover for removal. To this end use could be made of a disposition whereby the detector and the ejector have different axial positions in the conveying direction, while a register or other memory is present, the input and output of which introduce a time delay coupled with the conveyor speed such that the ejector placed downstream in relation to the detector ejects with certainty the correct, i.e. wrongly, oriented cover.

Such a method is however not very reliable, because cover flows have an element of unpredictability. Depending on the type of cover and the spread of characteristics between individual covers and loads, the covers which for instance press against each other may display a greater or lesser resilience, with the result, certainly in the case there is a slightly greater axial distance between the detector and the ejector, that the uncertainty at the location of the ejector can be so great, that such a disposition would not be able to function at all with any reasonable degree of reliability.

The invention therefore recommends an embodiment, in which the ejector and the detector are positioned on the same axial position on the conveyor.

With a flow of correctly oriented covers of the defined type of peripheral surface of the flow of covers is more or less unbroken. A reliable detection criterion for the presence of a wrongly oriented cover is therefore obtained with an embodiment in which the detector is arranged to generate an eject signal to the ejector when the peripheral surface of the cover flow determined by the peripheral edges of the covers displays an interruption. For instance a light beam and a light sensitive element, such as a photocell, can be used to establish such an interruption. It has been found in practice however that such a detection lends itself less well to being used for cover flows of a varying type.

According to the invention preference is therefore given to a variant, in which at least the edges of the covers contain metal and the detector is arranged to detect the absence of metal.

This variant in particular can be embodied such that the detector is of the electrical and/or magnetic approach type.

Use can be made of a detector which works on the basis of a capacitive determination, acts by means of magnetism or is based on the detuning of a tuned circuit caused by the temporary absence of metal.

It is self-evident that the ejector must be sufficiently rapid to ensure with complete certainty that the wrongly oriented cover is ejected. The speed of the ejector is of great importance particularly in the case of great conveying speeds.

The ejector can comprise a pneumatic drive, which is controlled electrically or also comprise an electromagnetic drive, for example a solenoid with a ferromagnetic core, which can be withdrawn inside the solenoid at great speed by transmitting a pulsating current through it. The ferromagnetic core carries an element, which exerts the ejecting force on the relevant cover.

BRIEF DESCRIPTION OF THE DRAWINGS

The invention will now be elucidated with reference to the drawing. In the drawing.

DETAILED DESCRIPTION OF THE PREFERRED EMBODIMENT

Figure 1:
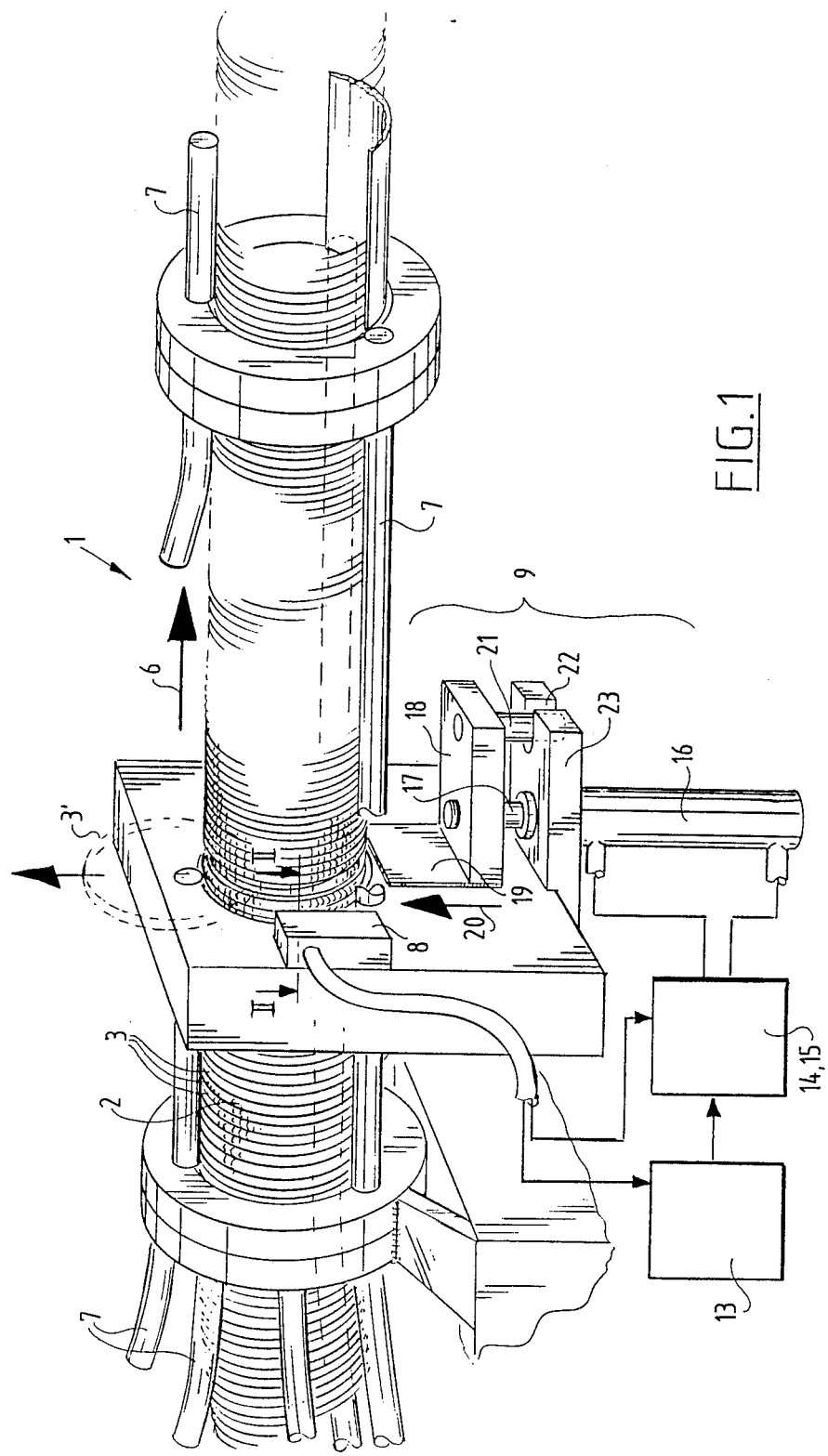
FIG. 1 shows a perspective view of a device according to the invention.
Figure 2:
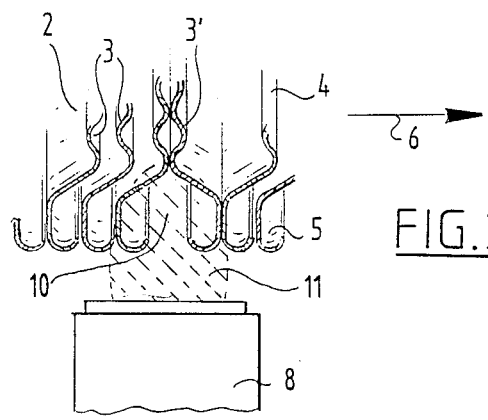
FIG. 2 shows the detail II—II from FIG. 1.

FIG. 1 shows a device 1 for the removal of individual covers 3 from a continuous flow 2 of covers 3 each, as shown in FIG. 2, comprising a middle portion 4 and a peripheral edge 5 extending asymmetrically around it in relation to the main plane thereof, the main planes of which covers extend perpendicularly to the conveying direction 6, while the nominal orientations of the covers 3 in the conveying direction 6 are all the same, and the said individual covers are oppositely oriented in relation to the nominal orientation and designated by the reference 3'.

The device 1 comprises a conveyor with a wire gutter 7 for transporting the covers 3, 3' by undrawn means in a continuous flow such that they press against each other; a detector 8 placed ajacent to the wire gutter for determining the possible presence of an oppositely oriented cover 3'; and an ejector 9 to remove from the flow 2 an oppositely oriented cover 3' observed by the detector 8.

Figure 3:
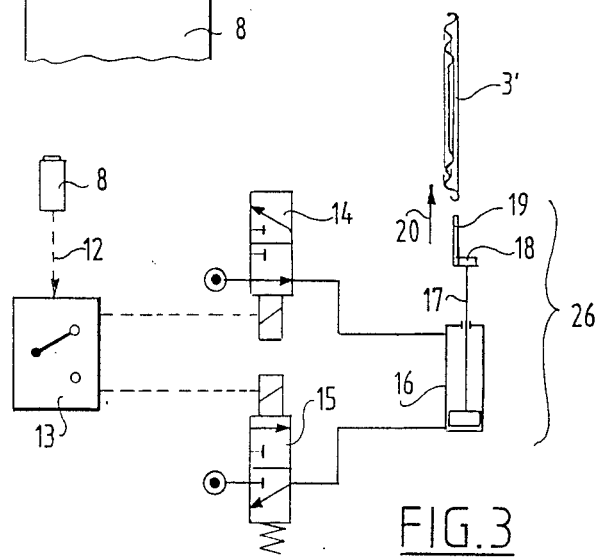
FIG. 3 is a diagram of an ejector with pneumatic driving.

As FIG. 2 shows, the peripheral edges 5 of the correctly oriented covers 3 together define a substantially unbroken peripheral surface of the flow 2. However, at the location where there is a wrongly oriented cover 3', the peripheral surface of the flow 2 is interrupted. This interruption is designated in FIG. 2 by 10. The detector 8 arranged along the path of the flow 2 is of the type that is capable of generating a signal as soon as an interruption 10 passes. The covers 3, 3' are of tin and the detector 8 produces a magnetic field drawn very schematically and indicated by 11. When the form of the peripheral surface of the flow 2 is uninterrupted this field has within certain fluctuations a constant value, but the presence of an interruption 10 in the flow of metal covers 5 causes a disturbance of the magnetic field 11, which is observed by the detector 8 and which causes the forming of a detection signal, which is fed via a cable 12 (see FIG. 3) to a control unit 13, which can actuate pneumatic valves 14, 15 for controlling a pneumatic cylinder 16 which forms part of the ejector 26. When the pneumatic cylinder 16 is actuated the plunger 17 is pushed upward at great speed taking with it a block 18 which carries on one side an ejector plate 19 for ejecting a cover 3' in the direction of arrow 20, and which carries on the other side a pin 21, which co-acts with an opening 22 in a supporting frame 23 for holding the ejector plate 19 in the correct position. The supporting frame 23 carries the pneumatic cylinder 16 and the detector 8.

As shown in FIG. 1, the detector 8 and the ejector plate 19 are situated on the same axial position of the flow of covers 2. Immediately a detection signal is generated by the detector 8 energizing of the pneumatic cylinder 16 and ejection of the relevant cover therefore take place.

Figure 4:
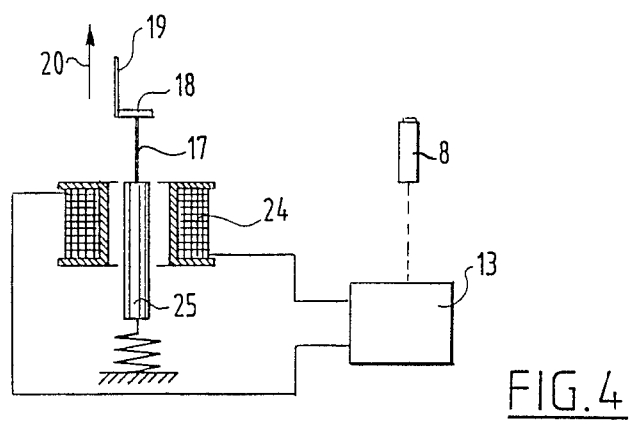
FIG. 4 is a diagram of an ejector with an electromagnetic driving.

FIG. 4 shows a variant in which the control unit 13 is arranged for generating a strong pulsating current to a solenoid 24 having therein an up and downward moveable iron core 25 which can drive the ejector plate 19.

I claim:

1. A device for removing improperly oriented covers from a continuous flow of covers, the continuous flow of covers having a flow pattern and a direction of flow, each cover having a middle portion positioned substantially in a plane perpendicular to the direction of flow and an edge portion surrounding the middle portion and oriented relative to the plane, the device comprising:
   conveyor means for transporting the covers in the direction of flow;
   generator means for generating a field in the continuous flow of covers;
   detector means associated with the conveyor means for detecting a wrongly oriented cover by a change in the field and for generating a signal whenever a change occurs; and
   ejector means associated with the conveyor means and responsive to the signals generated by the detector means for removing wrongly oriented covers from the continuous flow of covers, wherein the detector means and the ejector means are mounted to the conveyor means in substantially the same axial position relative to the flow of the covers.

2. The device of claim 1 wherein the generator means comprises means for generating a magnetic field across metal-containing portions of the covers which fluctuates whenever a change occurs in the flow pattern.

3. The device of claim 1 wherein the generator means comprises means for generating a magnetic field across metal-containing edge portions of the covers which fluctuates whenever a change occurs in the flow pattern.

4. The device of claim 1 wherein the generator means comprises means for generating an electric field across metal-containing portions of the covers which fluctuates whenever a change occurs in the flow pattern.

5. The device of claim 1 wherein the generator means comprises means for generating an electric field across metal-containing edge portions of the covers which fluctuates whenever a change occurs in the flow pattern.

6. The device of claim 1 wherein the ejector means comprises a pneumatic drive operatively connected to a plunger assembly and responsive to signals generated by the detector means; the plunger assembly having a lower stationary mounting plate attached to the conveyor means, a pneumatic cylinder connected to the mounting plate and operatively connected to the pneumatic drive, a plunger at least partially in the pneumatic cylinder which is pushed outward toward the flow of covers when the pneumatic drive is actuated and which retracts into the pneumatic cylinder when the pneumatic drive is deactivated, a block member mounted to an outer end of the plunger, and an ejector plate mounted to the block which is introduced at least partially into the flow of covers to force a wrongly oriented cover out of the continuous flow of covers whenever the pneumatic drive is activated in response to a signal from the detector means and which is subsequently withdrawn when the pneumatic drive is deactivated.

7. The device of claim 1 wherein the ejector means comprises an electric drive operatively connected to a plunger assembly and responsive to signals generated by the detector means; the plunger assembly having a lower stationary mounting plate attached to the conveyor means, a plunger housing connected to the mounting plate, a plunger at least partially in the plunger housing which is pushed outward toward the flow of covers when the electric drive is activated and which retracts into the plunger housing when the electric drive is deactivated, a block member mounted to an outer end of the plunger, and an ejector plate mounted to the block which is introduced at least partially into the flow of covers to force a wrongly oriented cover out of the continuous flow of covers whenever the electric drive is activated in response to a signal from the detector means and which is subsequently withdrawn when the electric drive is deactivated.

* * * * *

UNITED STATES PATENT AND TRADEMARK OFFICE
CERTIFICATE OF CORRECTION

PATENT NO. : 4,977,998

DATED : December 18, 1990

INVENTOR(S) : Derk J. Middeldorp

It is certified that error appears in the above-identified patent and that said Letters Patent is hereby corrected as shown below:

In Col. 2, line 2, delete the first occurrence of "of" and substitute therefor --the--.

Signed and Sealed this

Twenty-second Day of December, 1992

Attest:

DOUGLAS B. COMER

Attesting Officer      Acting Commissioner of Patents and Trademarks